UNITED STATES PATENT OFFICE.

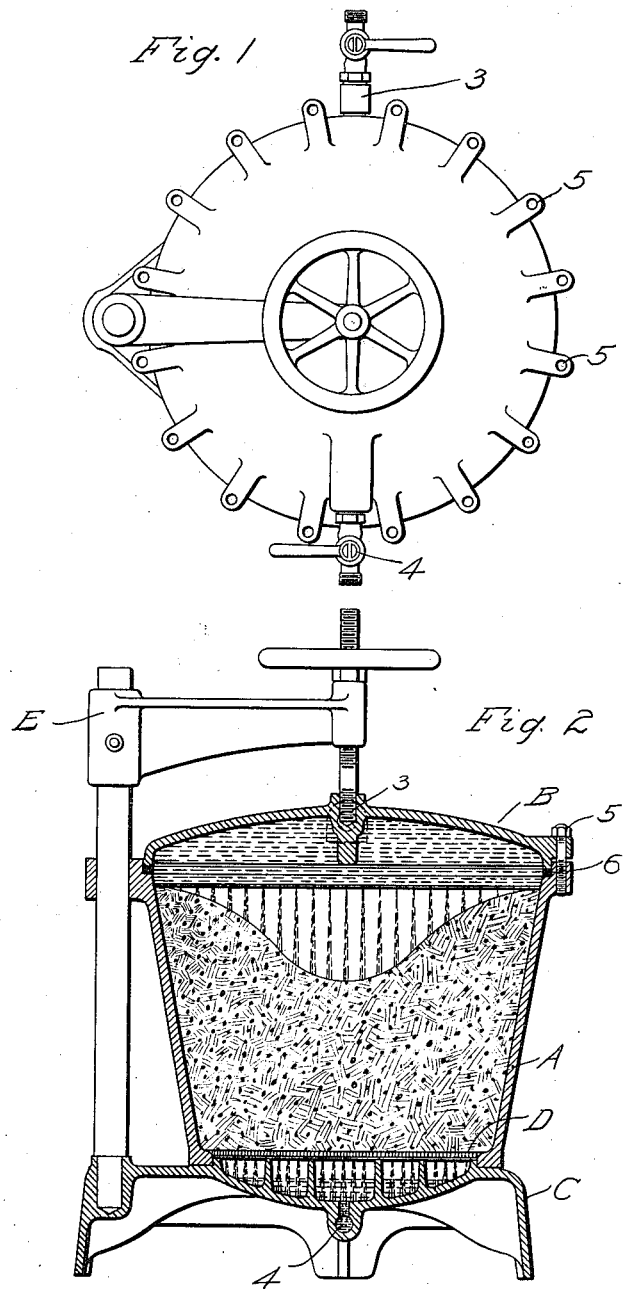

KARL KIEFER, OF CINCINNATI, OHIO.

FILTERING MATERIAL.

981,658.

Specification of Letters Patent.   Patented Jan. 17, 1911.

Application filed October 19, 1908.   Serial No. 458,491.

*To all whom it may concern:*

Be it known that I, KARL KIEFER, a citizen of the United States, and resident of Cincinnati, in the county of Hamilton and State of Ohio, have invented a new and useful Improvement in Filtering Material, of which the following is a specification.

My invention relates to an improvement in filtering material for the purpose of the filtration of water and similar liquids.

The object of this invention is to produce a filtering material of great capacity and cheapness.

The invention is illustrated in its use in the accompanying drawings, of which—

Figure 1 is a top view upon the filter casing; Fig. 2 is a cross section through the filter adapted for the use of my improved filtering material.

The main casing A, Fig. 2, is provided with a cover B and a base casing C. It has a false bottom of wire or other similar material D, with meshes fine enough to retain the filtering material. This casing A is cone shaped. The inlet 3 in the cover serves for the admission of the water and the outlet 4 in the base casing serves for the egress of the clear liquid. The cover is fastened in the known manner by bolts and nuts 5, and is hermetically tightened by means of the rubber gasket 6. The cover being heavy in the larger size, is suspended by swinging crane with hand wheel E, the construction of which is easily seen from the drawing.

My improved filtering material consists of a granular mineral material in combination with a smaller amount of fibrous mineral material. The granular material consists of common river sand or powdered quartz, and the fibrous mineral material is powdered asbestos, often called by the trade "asbestic finish". The ratio of its use is approximately 200 lbs. sand and 33 lbs. asbestos fiber. The asbestos alone would clog up very quickly, but in combination with the sand, a large filtering area is presented to the water, and very efficient results may be obtained by this combination. This filtering material may be washed from its impurities in a manner common to other sand filters.

What I claim as my invention and desire to secure by Letters Patent is:—

1. A filtering material consisting of approximately six parts sand and one part asbestos in a mechanical mixture.

2. A filtering material consisting in a mechanical mixture of a granular mineral material in combination with a fibrous mineral material.

3. A filtering material consisting in a mechanical mixture of approximately six parts granular mineral material and one part fibrous mineral material.

4. A filtering material consisting in a mechanical mixture of a granular material in combination with a fibrous material.

5. A filtering material comprising a mixture of fibrous material with a granular substantially incompressible material of such grade that when agitated together the components of the mixture will not readily separate or segregate.

In testimony whereof I have signed my name to this specification in the presence of two subscribing witnesses.

KARL KIEFER.

Witnesses:
E. E. FINCH,
G. W. WERDEN.